United States Patent Office 3,052,678
Patented Sept. 4, 1962

---

3,052,678
BASIC ETHERS OF N-HETEROCYCLIC
COMPOUNDS
Erich Ziegler, Graz, Austria, and Franz Litvan, Basel,
Switzerland, assignors to Geigy Chemical Corporation,
Ardsley, N.Y., a corporation of Delaware
No Drawing. Filed June 8, 1960, Ser. No. 34,646
Claims priority, application Switzerland June 9, 1959
8 Claims. (Cl. 260—243)

The present invention concerns new basic ethers which have valuable pharmacological properties and their salts.

It has surprisingly been found that basic ethers of the general formula

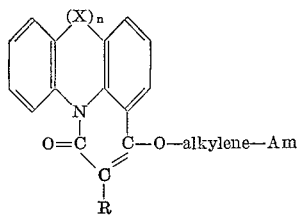

(I)

wherein

X represents a divalent radical selected from the group consisting of the methylene radical, the ethylene radical and the thio radical, $n$ represents an integer selected from the group consisting of 0 and 1, R represents a member selected from the group consisting of hydrogen and the benzyl radical, alkylene represents an alkylene radical with 2–3 carbon atoms, and Am represents a member selected from the group consisting of a di(lower)alkIamino radical, a polymethyleneimino radical with 5–7 ring members and the morpholino radical, have valuable pharmacological properties, in particular anti-allergic activity with low vegetable side effects, as well as analgetic and antipyretic activity, and are useful for the treatment of mental disorders. They are administered per os or, in the form of aqueous solutions of their salts with non-toxic acids also parenterally by injection. Of the new basic ethers of general Formula I, those are particularly valuable wherein R is represented by hydrogen and Am by a di(lower)alkylamino group, especially the dimethylamino or diethylamino group.

The new basic ethers defined above are produced by reacting a compound of the general formula Am-alkylene-Hal    (II)

with a salt of an N-heterocyclic compound of the general formula

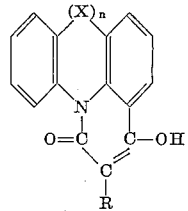

(III)

wherein Hal represents chlorine or bromine and Am, alkylene, X, $n$ and R have the meanings given above. The reactions are performed, advantageously, in an inert organic solvent such as, e.g. xylene, in the warm.

The N-heterocyclic compounds of the general Formula III necessary as starting materials can be obtained by reacting compounds of the general formula

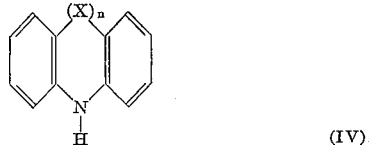

(IV)

wherein X and $n$ have the meanings given above, with suitable malonic acid derivatives. A such, on the one hand, diaryl esters, in particular bis-(2,4-dichlorophenyl)-esters, as well as dialkyl esters of α-substituted malonic acids which produce compounds of the general Formula III on heating with the N-heterocyclic compounds mentioned above to 250–300° C., in which R is a benzyl radical, are suitable. On the other hand, compounds of the general Formula III in which R is hydrogen, are obtained by condensing the above-mentioned N-heterocyclic compounds with malonic acid by means of phosphorus oxychloride at temperatures of about 100–110°. Also, such starting materials are obtained by treating compounds of the general Formula III which have a suitable substituent R which can be split off, for example, the benzyl radical, with aluminium chloride or aluminium bromide at temperatures of about 250° C.

The starting materials of the general Formula III, given in the tautomeric dioxo form, are: 8,9-malonyl carbazole, 8,9-benzylmalonyl carbazole, 5,10-malonyl-9,10-dihydroacridine, 5,10-benzylmalonyl-9,10-dihydroacridine, 4,5-malonyl iminodibenzyl, 4,5-benzylmalonyl iminodibenzyl, 9,10-malonyl phenothiazine and 9,10-benzylmalonyl phenothiazine.

As examples of suitable compounds of the general Formula II are named:

Dimethylaminoethyl chloride, diethylaminoethyl chloride, methylethylaminoethyl chloride, β-dimethylaminopropyl chloride, β-dimethylaminoisopropyl chloride, γ-dimethylaminopropyl chloride, β-(di-n-propylamino)-ethyl chloride, β-(methylisopropylamino)-ethyl chloride, β-(di-n-butylamino)-ethyl chloride, β-(di-isobutylamino)-ethyl chloride, pyrrolidyl-(1)-ethyl chloride, piperidino ethyl chloride, β-piperidino propyl chloride, β-piperidino isopropyl chloride, γ-piperidino propyl chloride, morpholinyl-(4) ethyl chloride and γ-morpholinyl-(4)-propyl chloride, as well as the corresponding bromides.

In addition, the new basic ethers of the general Formula I are also obtained by reacting a compound of the general formula

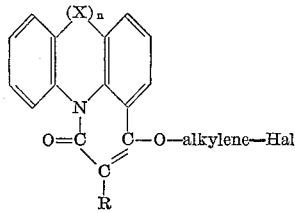

(V)

with an amine of the general formula

Am—H    (VI)

wherein X, $n$, R, Hal, alkylene and Am have the meanings given above, the reaction being performed in the presence of an acid binding agent. The reaction can be preformed, for example, at a moderately high temperature, e.g. 80–120° C., in an inert solvent such as e.g. a low molecular alkanol or alkanone, advantageously an excess of the amine to be reacted being used as acid binding agent. Depending on the boiling point of the amine and solvent used as well as the temperature necessary to perform the reaction, if necessary the reaction should be performed in a closed vessel. Compounds of general formula V are obtained, for example, by reacting alkali metal salts of compounds of the general Formula II with non-geminal dihaloethanes or dihalopropanes such as 1,2-dibromoethane, 1,2-dibromopropane or 1-bromo-3-chloropropane. The compounds of general Formula V are reacted for example with dimethylamine, methylethylamine, diethylamine, di-n-butylamine, pyrrolidine, piperidine, hexamethyleneimine or morpholine.

The tertiary bases can be converted, if desired, into salts, some of which are water soluble, with organic or inorganic acids such as hydrochloric acid, hydrobromic acid, sulphuric acid, phosphoric acid, methane sulphonic acid, ethane disulphonic acid, acetic acid, citric acid, malic acid, succinic acid, fumaric acid, maleic acid, tartaric acid, benzoic acid and phthalic acid.

The following examples further illustrate the production of the basic ethers according to the invention without limiting the scope of the invention, however, to these examples. Parts are given as parts by weight and their relationship to parts by volume is as that of grammes to cubic centimetres. The temperatures are in degrees centigrade.

*Example 1*

16.7 parts of carbazole are triturated with 16.0 parts of malonic acid and 70 parts of naphthalene, 60 parts of phosphorus oxychloride are then added and the mixture is heated for 1 hour at 90°. A clear melt is obtained which slowly becomes darker coloured. It is finally heated for 15 minutes to about 107°. The excess phosphorus oxychloride is then distilled off at 40° under 10 mm. pressure, water is added to the residue, the naphthalene is distilled off by steam distillation, the crude product is triturated twice with ethanol and once with a little nitrobenzene in the cold and is finally recrystallised from nitrobenzene. The 8,9-malonyl carbazole (4,6-dioxo-5,6-dihydro-4H-pyrido[3,2,1-d,e]carbazole) obtained melts at 320°.

17 parts of 4,5-malonyl carbazole sodium (obtained by dissolving 4,5-malonyl carbazole in double the amount by weight of 2 N-sodium ethoxide solution and precipitating the salt with acetone or ether) are suspended in 170 parts by volume of xylene and a solution of 9 parts of diethylaminoethyl chloride in 30 parts of xylene is added dropwise while introducing nitrogen and stirring. The whole is brought slowly to the boil whereupon the sodium salt dissolves. After about 30 minutes it is cooled to about 90° and another 9 parts of β-diethylamino-ethyl chloride dissolved in xylene are added. The whole is again heated to 150° for 30 minutes, sodium chloride is filtered off and the solution is concentrated in the vacuum at 45°. 60 parts by volume of alcohol are added to the residue which is then cooled with ice and the precipitated crystals are removed by filtration. The 4-(β-diethylamino-ethoxy)-6-oxo-6H-pyrido[3,2,1-d]carbazole is dried. The hydrochloride of the above base is obtained from the alcoholic filtrate by adding methanolic hydrochloric acid and then leaving to stand in the cold. Other bases can be obtained by treating the hydrochloride with aqueous ammonia. After crystallisation from acetone and from ethyl acetate, the free base is obtained in the form of needles which melt at 146–147°.

The same compound can also be obtained from the sodium salt of 4,5-malonyl carbazole by reaction with ethylene bromide and then reacting the second bromine atom with diethylamine.

*Example 2*

1.95 parts of iminodibenzyl are heated for 2 hours at 250° with 4.8 parts of benzyl malonic acid-bis-(2,4-dichlorophenylester). The melt which solidifies crystalline in the cold is triturated with benzene and, after filtering under suction, is recrystallised from nitrobenzene, tetrachlorethane or dioxan. 4,5-benzylmalonyl-iminodibenzyl, (2-benzyl-1,3-dioxo-2,3,7,8-tetrahydro-1H-quinolo[8,8a,1-a,b]benzo[f]azepine) is obtained in the form of platelets which melt at 253°.

9 parts of 4,5-benzylmalonyl-iminodibenzyl are heated for 10 minutes at 240° with 13.5 parts of aluminum chloride and 20 parts of phenol. Water is then added to the reaction mixture and the precipitated substance is triturated well with 25% alcohol. After drying, the 4,5-malonyl-iminodibenzyl is recrystallised from nitrobenzene whereupon it melts at 289°.

15 parts of 4,5-malonyl-iminodibenzyl are dissolved in the cold in 30 parts by volume of 2 N-sodium ethoxide solution and the sodium salt is precipitated in crystalline form by the addition of acetone. 11.4 parts of the sodium salt are suspended while stirring well and introducing nitrogen, in 130 parts by volume of xylene and the suspension is heated to 135°. A solution of 10 parts of β-dimethylaminoisopropyl chloride in 20 parts by volume of xylene is gradually added dropwise and the whole is heated for another 7 hours at 135°. After cooling, precipitated sodium chloride and non-reacted sodium salt are filtered off and the xylene solution is concentrated in the vacuum at 50°. The oil which remains is crystallised by triturating with 20 parts by volume of ether. The crystal slurry is left to stand overnight at 0°, liquid parts are drawn off under suction and the filter residue is crystallised from cyclohexane whereupon 1-oxo-3-(β-dimethylaminoisopropoxy)-7,8-dihydro-1H-quinolo-[8,8a,1-a,b]benzo[f]azepine is obtained in the form of thick needles, M.P. 137–138°.

In an analogous manner on using γ-dimethylamino-propyl chloride instead of β-dimethylamino-isopropyl chloride, 1-oxo-3-(γ-dimethylamino-propoxy)-7,8-dihydro-1H-quinolo[8,8a,1-a,b]benzo[f]azepine is obtained, M.P. 65°.

Also in an analogous manner on using 12.5 parts of β-pyrrolidyl-(1)-isopropyl chloride, 1-oxo-3-(β-pyrrolidyl-(1')-isopropoxy)-7,8-dihydro-1H-quinolo[8,8a,1,-a,b]-benzo[f]azepine is obtained.

*Example 3*

10 parts of phenothiazine, 10 parts of malonic acid and 7.5 parts of naphthalene are heated with 14.5 parts of phosphorus oxychloride for 2 hours at 80°. Water is then added to the recation mixture and the naphthalene is removed by steam distillation. The residue is dissolved in dilute caustic soda lye, the solution is shaken with ether, then acidified and the crude 9,10-malonyl phenothiazine (1,3-dioxo-2,3-dihydro-1H-pyrido[3,2,1-k,l]-phenothiazine) which precipitates is recrystallised from nitrobenzene. M.P. 268°.

5.8 parts of the sodium salt of 9,10-malonyl phenothiazine obtained analogously to Example 1 are suspended in 800 parts by volume of xylene and the suspension is heated to 135–140°. 15 parts by volume of a solution of 7.7 parts of β-dimethylaminoethyl chloride in 30 parts by volume of xylene are then added and then the remainder of this solution is added in portions of 5 parts by volume once every hour. In all, the reaction takes 6 hours. The precipitated sodium chloride is then filtered off and the xylene is distilled off in the vacuum at 50°. The residue is completely crystallised by triturating with 40 parts by volume of petroleum ether. The crystals are filtered off under suction and recrystallised from cyclohexane or benzine (B.P. 90–100°), whereupon the 1-oxo-3-(β-dimethylamino-ethoxy)-1H-pyrido[3,2,1-k,l]phenothiazine is obtained as yellowish coloured platelets which melt at 107–108°.

On using 8.9 parts of γ-dimethylamino-propyl chloride, 1-oxo-3-(γ-dimethylamino-propoxy)-1H-pyrido[3,2,1-k,l]phenothiazine is obtained in an analogous manner. M.P. 92°.

*Example 4*

10 parts of the sodium salt of 4,5-malonyl iminodibenzyl (see Example 2) are suspended in 130 parts by volume of anhydrous xylene and the suspension is heated for 2 hours in a nitrogen atmosphere at 150° with about ⅔ of a solution of 8 parts of β-diethylamino-ethyl chloride in 25 parts by volume of xylene. The remainder of the β-diethylamino-ethyl chloride is added and the reaction mixture is heated for another 2½ hours at 150°. After cooling, the sodium chloride is filtered off, the filtrate is concentrated in the vacuum at 40–50°, the residue is triturated with acetone and the solid substance is filtered off under suction. On crystallising from cyclohexane with the addition of animal charcoal the 1-oxo-3-(β-diethylamino-ethoxy)-7,8-dihydro-1H-quinolo[8,8a,1-a,b]benzo[f]azepine is obtained as fine crystals which melt at 119°.

In an analogous manner, on using 9 parts of β-piperidino-ethyl chloride, 1-oxo-3-(β-piperidino-ethoxy)-7,8-dihydro-1H-quinolo[8,8a,1a,b]benzo[f]azepine is obtained and on using 9.5 parts of β-morpholinyl-(4)-ethyl chloride, 1-oxo-3-(β-morpholinyl-(4')-ethoxy)-7,8 - dihydro-1H-quinolo[8,8a,1-a,b]benzo[f]azepine is obtained.

Example 5

15.9 parts of the sodium salt obtained analogously to Example 4 of 4,5-benzylmalonyl-iminodibenzyl (see Example 2 first paragraph) are suspended in 160 parts by volume of xylene and, first of all, 40 parts by volume of a solution of diethylaminoethyl chloride (produced from 18.2 parts of β-diethylamino-ethyl chloride-hydrochloride in 50 parts by volume of xylene) are added. This mixture is heated for 1 hour at 140° whereupon the remainder of the β-diethylamino-ethyl chloride solution is added and the whole is heated for another 1½ hours at the same temperature. After cooling, the reaction mixture is filtered, the xylene is evaporated off in the vacuum and the residue which solidifies crystalline is triturated with petroleum ether. After filtering, the 1-oxo-2-benzyl-3-(β-diethylamino-ethoxy)-7,8-dihydro-1H - quinolo[8,8a,1-a,b]benzo[f]azepine is obtained by crystallising from acetone or ethyl acetate. From the former it is obtained in the form of needles and from the latter in the form of thick needles. M.P. 132–132.5°.

Example 6

6.4 parts of the sodium salt of 8,9-malonyl carbazole are suspended in 130 parts by volume of anhydrous xylene, 5.4 parts of β-dimethylamino-ethyl chloride in 10 parts by volume of xylene are added dropwise while stirring in a nitrogen atmosphere and the whole is boiled for 4 hours. After cooling, the resinous parts and the precipitated sodium chloride are filtered off and the filtrate is evaporated to dryness in the vacuum at 45°. The residue is triturated with petroleum ether, the liquid phase is drawn off under suction and the residue is crystallised from benzine (B.P. 90–110°), whereupon the 4-(β-dimethylamino-ethoxy)-6-oxo-pyrido[3,2,1-d,e]carbazole is obtained, M.P. 126–128°. This base is purified by dissolving in dilute hydrochloric acid and precipitating with ammonia. After crystallisation from cyclohexane it melts at 136.5–137°.

The following procere can be used also: the solution liberated from sodium chloride by filtration is evaporated whereupon the residue is taken up in alcohol and the alcoholic solution is treated with alcoholic hydrochloric acid. After leaving to stand for some time in the cold, the precipitated hydrochloride is filtered off under suction section from which the free base is produced in the usual manner. The base so obtained melts at 136.5–137°.

In an analogous manner, on using 6.7 parts of β-pyrrolidyl-(1)-ethyl chloride, 4-(β-pyrrolidyl-(1')-ethoxy)-6-oxo-6H-pyrido[3,2,1-d,e]carbazole is obtained, and on using 7.4 parts of β-piperidino-ethyl chloride, 4-(β-piperidino-ethoxy)-6-oxo-6H-pyrido[3,2,1-d,e]carbazole is obtained.

Example 7

11.6 parts of the sodium salt of 9,10-malonyl phenothiazine are suspended in 150 parts by volume of xylene and the suspension is heated in a nitrogen atmosphere while stirring at 135°. A solution of 14.7 parts of β-dimethylamino-isopropyl chloride in 30 parts by volume of xylene is added dropwise and the whole is heated for 3 hours at 135°. After filtering off the precipitated sodium chloride, the xylene solution is concentrated in the vacuum at 50°. The honey-like residue becomes crystalline after seeding with a crystal nucleus and it can be purified by crystallising from cyclohexane. The 1-oxo-3-(β-dimethylamino-isopropoxy)-1H-pyrido[3,2,1-k,1]phenothiazine is obtained as yellow plates which melt at 118–120°. A small amount of a substance in the form of a yellow prisms which melt at 93° can be obtained by concentrating the cyclohexane mother liquor. The analysis thereof agrees with that of the crystals melting at 118–120° and it is, apparently, an isomer of the latter substance, possibly, 1-oxo-3-(β-dimethylamino-propoxy)-1H - pyrido[3,2,1-k,1]phenothiazine. On recrystallising the crystals melting at 118–120° from alcohol/water, a hydrate which melts at 63° is obtained.

1-oxo-3-(β-pyrrolidyl-(1')-ethoxy)-1H - pyrido[3,2,1-k,1]phenothiazine is obtained in an analogous manner on using 17.8 parts of β-pyrrolidyl-(1)-ethyl chloride.

Example 8

20 parts of 9,10-dihydroacridine are triturated well with 17.2 parts of malonic acid and 80 parts of naphthalene, 67.8 parts of phosphorus oxychloride are then added and the whole is heated for 1 hour at 90° and, finally for another 15 minutes at 105–108°. After cooling, ice water is added to the reaction mixture and the naphthalene is then removed by steam distillation. The organic substance which remains is triturated with a little nitrobenzene, the solid portion is filtered off under suction and, after decolouring with animal charcoal, is crystallised from nitrobenzene. 5,10-malonyl-9,10-dihydroacridine (1,3-dioxo-2,3-dihydro-1H,7H-pyrido[3,2,1-k,1]-acridine) is obtained which melts at 247°. The substance crystalises into little rods from dioxan.

3 parts of 5,10-malonyl-9,10-dihydroacridine are triturated with 6.1 parts by volume of 2 N-methanolic sodium ethoxide solution and the sodium salt formed is precipitated by the addition of dioxan.

9.5 parts of the sodium salt so obtained are suspended in 50 parts by volume and 10.5 parts of β-dimethylamino-isopropyl chloride in 100 parts by volume of xylene are added. The reaction mixture is gradually brought to 140° and then kept at this temperature for 2 hours. It is then cooled, charcoal is added and it is then filtered. The filtrate is concentrated in the vacuum at 40°. The residue which solidifies crystalline is triturated with a little cyclohexane/benzene and is recrystallised from isopropyl ether whereupon 1-oxo-3-(β-dimethylamino-isopropoxy)-1,7 - dihydro - pyrido[3,2,1 - d,e]acridine which melts at 126° is obtained.

Example 9

10 parts of the sodium salt of 9,10-malonyl phenothiazine are suspended in 120 parts by volume of anhydrous xylene and the suspension is heated at 135° in a nitrogen atmosphere. 12 parts of γ-dimethylamino-n-propyl chloride in 40 parts by volume of xylene are added over a period of 90 minutes and the reaction mixture is heated while stirring vigorously for, in all, 4 hours. After cooling and filtering, the filtrate is concentrated in the vacuum at 50°. The crystallized residue is liberated completely from xylene in the vacuum over calcium chloride and paraffin. After triturating with cyclohexane, 1-oxo-3-(γ-dimethylamino-propoxy)-1H-pyrido[3,2,1-k,1]phenothiazine which melts at 82–84° is obtained. On crystallising from cyclohexane, small yellowish crystals which melt at 92° or yellowish plates which melt at 81° are obtained. The melting point of these two modifications mixed together is 92° and their analysis results (C, H, N, S) correspond.

1 - oxo - 3 - (γ - morpholinyl - (4') - propoxy) - 1H-pyrido[3,2,1-k,1] phenothiazine is obtained in an analogous manner on using 16.5 parts of γ-morpholinyl-(4)-n-propyl chloride.

*Example 10*

13 parts of the sodium salt of 8,9-malonyl carbazole are suspended in 150 parts of xylene, the suspension is heated to 135° and 20.1 parts of β-dimethylamino-isopropyl chloride dissolved in 40 parts by volume of xylene are very gradually added. In all, the reaction mixture is heated 3½ hours at 135° in a nitrogen atmosphere while stirring. The sodium chloride is then removed by filtration, the xylene is evaporated off in the vacuum at 50° and the resinous residue is triturated with 40 parts by volume of ether whereupon crystallisation occurs. After recrystallisation from cyclohexane, the 4-(β-dimethylamino - isopropoxy) - 6 - oxo - 6H - pyrido[3,2,1 - d,e] carbazole melts at 124–125°.

*Example 11*

A viscous oil is obtained from 3 parts of sodium salt of 5,10-malonyl-9,10-dihydroacridine and 7.1 parts of β-dimethylaminoethyl chloride in, in all, 65 parts by volume of xylene by heating for 2 hours at 140°, removing the sodium chloride by filtration and evaporating the filtrate in vacuo at 40°. The oil can be crystallised by triturating with cyclohexane. After recrystallisation from isopropyl ether, the 1-oxo-3-(β-dimethylaminoethoxy)-1,7-dihydro-pyrido[3,2,1-d,e]acridine so obtained melts at 110°.

1 - oxo - 3 - (β - piperidino - ethoxy) - 1,7 - dihydro-pyrido[3,2,1-d,e]acridine is obtained in an analogous manner on using 9.7 parts of β-piperidino-ethyl chloride.

*Example 12*

15.9 parts of the sodium salt of 9,10-malonyl phenothiazine are suspended in 150 parts by volume of anhydrous xylene and the suspension is heated at 145–150° while stirring well in a nitrogen atmosphere. 35 parts by volume of a solution of 9.7 parts of β-diethylaminoethyl chloride in 50 parts by volume of anhydrous xylene are added and the remainder of the solution is added after 45 minutes. The whole is heated for a further 45 minutes, the sodium chloride is removed and the xylene is distilled off in vacuo at 50°. The crude product which solidifies crystalline is triturated with 50 parts by volume of ether, filtered off under suction and is washed twice with 20 parts by volume of ether each time. The 1-oxo-3 - (β - diethylamino - ethoxy) - 1H - pyrido[3,2,1-k,1] phenothiazine so obtained melts at 94.5–95.5°. The pure substance melting at 97–98° is obtained by recrystallisation from about 110 parts by volume of benzine (B.P. 90–110°).

What we claim is:

1. A compound selected from the group consisting of a basic ether of the formula

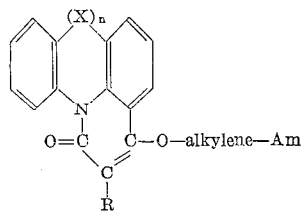

wherein X represents a divalent radical selected from the group consisting of the methylene radical, the ethylene radical and the thio radical, n represents an integer selected from the group consisting of 0 and 1, R represents a member selected from the group consisting of hydrogen and the benzyl radical, alkylene is a member selected from the group consisting of ethylene, propylene and isopropylene; and Am represents a member selected from the group consist- of a di(lower)alkylamino group, piperidino, pyrrolidino, hexamethyleneimino and morpholino, and the salt thereof with a non-toxic acid.

2. The compound 1-oxo-3-(γ-dimethylamino-propoxy)-7,8-dihydro-1H-quinolo[8,8a,1-a,b]benzo[f]azepine.

3. The compound 1-oxo-3-(γ-dimethylamino-propoxy)-1H-pyrido[3,2,1-k,1]phenothiazine.

4. The compound 1-oxo-3-(β-diethylamino-ethoxy)-7,8-dihydro-1H-quinolo[8,8a,1-a,b]benzo[f]azepine.

5. The compound 1-oxo-2-benzyl-3-(β-diethylamino-ethoxy) - 7,8 - dihydro - 1H - quinolo[8,8a,1-a,b]benzo[f]azepine.

6. The compound 4-(β-dimethylamino-ethoxy)-6-oxo-6H-pyrido[3,2,1-d,e]carbazole.

7. The compound 1-oxo-3-(β-dimethylamino-isopropoxy)-1,7-dihydro-pyrido[3,2,1-d,e]acridine.

8. The compound 1-oxo-3-(β-diethylamino-ethoxy)-1H-pyrido[3,2,1-k,1]phenothiazine.

References Cited in the file of this patent

UNITED STATES PATENTS 2,919,271     Craig et al. _____ Dec. 29, 1959

OTHER REFERENCES

Baumgarten et al.: Ber. d. Deut. Chem. Ges., vol. 75, pages 984–986 (1942).

Fujii: J. Pharm. Soc., Japan, vol. 77, No. 10, pages 1065–1070 (1957).

Hromatka et al.: Monatsh. für Chemie, vol. 89, pages 790–7 (1958).